United States Patent [19]

Dormish et al.

[11] Patent Number: 5,204,439
[45] Date of Patent: Apr. 20, 1993

[54] TWO-COMPONENT POLYURETHANE ADHESIVE

[75] Inventors: Jeffrey F. Dormish, Pittsburgh, Pa.; Peter W. Boerner, Massillon, Ohio; Randall C. Rains, Pittsburgh, Pa.

[73] Assignee: Miles Inc., Pittsburgh, Pa.

[21] Appl. No.: 932,173

[22] Filed: Aug. 19, 1992

Related U.S. Application Data

[62] Division of Ser. No. 465,715, Jan. 16, 1990, Pat. No. 5,164,473.

[51] Int. Cl.$^5$ ............................................. C08G 18/32
[52] U.S. Cl. ..................................... 528/44; 521/137; 528/64
[58] Field of Search ............... 528/44, 64, 54, 55, 528/58, 60, 66, 85; 521/137, 163, 167

[56] References Cited

U.S. PATENT DOCUMENTS

| | | | |
|---|---|---|---|
| 3,714,127 | 1/1973 | Fabris et al. | 260/77.5 AM |
| 3,812,003 | 5/1974 | Larson et al. | 161/156 |
| 3,935,051 | 1/1976 | Bender et al. | 156/331 |
| 3,979,364 | 9/1976 | Rowton . | |
| 4,156,064 | 5/1979 | Falkenstein et al. | 528/46 R |
| 4,336,298 | 6/1982 | Schwarz | 428/285 |
| 4,444,976 | 4/1984 | Rabito | 528/60 |
| 4,552,934 | 11/1985 | Rabito et al. | 528/458 |
| 4,686,242 | 8/1987 | Turner et al. | 521/137 |
| 4,728,710 | 3/1988 | Goel | 528/58 |
| 4,743,672 | 5/1988 | Goel | 528/44 |
| 4,876,308 | 10/1989 | Melby et al. | 524/780 |
| 4,954,199 | 9/1990 | Rains et al. | 156/331.7 |

FOREIGN PATENT DOCUMENTS

| | | |
|---|---|---|
| 0304083 | 2/1989 | European Pat. Off. . |
| 1-048876 | 2/1989 | Japan . |

Primary Examiner—Morton Foelak
Assistant Examiner—Shelley A. Dodson
Attorney, Agent, or Firm—Joseph C. Gil; Godfried R. Akorli

[57] ABSTRACT

This invention relates to a low-viscosity two-component filled polyurethane adhesive comprising (a) a low-viscosity isocyanate component in a quantity sufficient to provide an isocyanate index of about 100 to about 150 comprising an organic polyisocyanate wherein up to 10 equivalent percent of the isocyanate groups of said organic polyisocyanate have been modified by reaction with one or more isocyanate-reactive compounds; and (b) a low-viscosity curative component comprising
 (i) 5 to 50 equivalent percent, based on the total equivalents of amino and hydroxyl groups of components (b)(i) and (b)(ii), of a polyether polyol and/or a polyether terminated by aromatic amino groups having an equivalent weight greater than 500,
 (ii) 50 to 95 equivalent percent, based on the total equivalents of amino and hydroxyl groups of components (b)(i) and (b)(ii), of one or more chain extenders and/or crosslinkers, wherein at least one diol chain extender comprises from 50 to 100 percent of the isocyanate-reactive equivalents of component (b)(ii), and
 (iii) one or more isocyanate-reactive diamines or triamines in a quantity sufficient to produce adequate resistance to flow when components (a) and (b) are mixed;

wherein at least one of components (a) or (b) contains at least one filler in a total quantity of from about 10 to about 40 percent by weight of the filled polyurethane adhesive.

18 Claims, No Drawings

TWO-COMPONENT POLYURETHANE ADHESIVE

This application is a division of application Ser. No. 07/465,715 filed Jan. 16, 1990, now U.S. Pat. No. 5,164,473.

BACKGROUND OF THE INVENTION

The present invention relates to a low-viscosity two-component filled polyurethane adhesive comprising an organic polyisocyanate component and an isocyanate-reactive curative component. The curative component comprises a blend of a relatively high equivalent weight isocyanate-reactive component and a relatively low equivalent weight chain extender or crosslinker, as well as certain diamines or triamines to impart sag resistance.

Urethane-based adhesives are well known for use in joining together various plastic materials. Although certain preformed polyurethanes can be used as adhesives by applying heat (for example, U.S. Pat. No. 4,156,064), the preferred urethane adhesives are typically two-component urethane-based adhesives comprised of an isocyanate component and an isocyanate-reactive curative component. Such adhesives are preferred over other adhesives, at least in part because of outstanding bond strength, flexibility, and resistance to shock and fatigue.

Various approaches for preparing improved two-component urethane adhesives have been described. One approach uses certain special reagents to improve the properties of the adhesives. For example, the addition of certain amide acetals to the curative component improves adhesive properties by inhibiting foaming. E.g., U.S. Pat. No. 4,728,710. The use of certain special isocyanate-reactive compounds (for example, special amines, amino alcohols, and thiols) as part of the curative component also provides improved adhesives. E.g., U.S. Pat. Nos. 3,714,127, 3,812,003, 3,935,051, and 4,336,298.

It is possible to improve adhesive properties without the need for special reagents of the types described above. For example, U.S. Pat. Nos. 3,979,364 and 4,743,672 disclose two-component urethane adhesives in which the curative component contains mixtures of polyols and polyoxyalkylene polyamines. These polyamines, in which the amino groups are bound to aliphatic carbon atoms, impart sag resistance as well as improved adhesion.

Efforts to improve adhesive properties have also focused on the polyol used in the curative component. For example, U.S. Pat. No. 4,336,298 specifically requires the use of polyester or polyether triols having a molecular weight range of about 400 to 1000, which corresponds to an equivalent weight of no more than about 333. U.S. Pat. No. 4,444,976 specifies a curative component containing polyols having at least two hydroxyl groups and a molecular weight range of about 100 to 2000, which corresponds to an equivalent weight of no more than 1000. Higher molecular weight polyols are disclosed but only for the preparation of prepolymers used as the polyisocyanate component. U.S. Pat. No. 4,552,934 discloses a curative component containing hydroxyl terminated prepolymers prepared by the reaction of organic polyisocyanates, polyols having a molecular weight range of about 150 to 3000, and polyamines. European Patent Application 304,083 discloses an isocyanate component containing a blend of an aliphatic isocyanate and an aromatic isocyanate prepolymer and a curative component containing a polyfunctional polyether polyol having a hydroxyl number of from 100 to 1200 (corresponding to equivalent weights of about 45 to about 561), a diamine, and an optional catalyst. Higher molecular weight polyols are disclosed but only for the preparation of the prepolymers of the isocyanate component.

Japanese Patent 89/48,876 discloses a two-component urethane adhesive having a polyisocyanate component and a curative component containing a mixture of relatively high molecular weight polyols, relatively low molecular weight polyols, zeolite filler, and catalyst. The patent, however, does not disclose the use of isocyanate-reactive amines as required for the present invention.

U.S. Pat. No. 4,876,308 discloses a two-component urethane adhesive having an isocyanate-terminated urethane prepolymer component and a curative component containing a nitrogen-free polyol (preferably a low molecular weight diol) and a primary amine for sag resistance, as well as optional fillers and other additives. In contrast to the present invention, the European application does not suggest the importance of using a curative component containing both a relatively high equivalent weight polyether polyol and a relatively low equivalent weight diol-containing chain extender or crosslinker and is entirely silent as to the use of aromatic amine terminated polyethers.

The use of low viscosity components in two-component adhesive systems is desirable as long as sag is not excessive. U.S. Pat. No. 4,552,934 describes the desirability of low viscosity components having viscosities of 35,000 cps (i.e., mPa.s) for the isocyanate component and approximately 50,000 cps for the curative component. Although described as having low viscosities, both adhesive components of the patent are considerably more viscous than those of the present invention. U.S. Pat. No. 4,336,298 (column 2) discloses a low viscosity hardener component having a viscosity of from 400 to 8000 mPa.s but requires a higher viscosity isocyanate component having a viscosity of from 20,000 to 55,000 mPa.s.

It has now surprisingly been found that a two-component adhesive having advantageous properties can be prepared using a low viscosity polyisocyanate component and a low viscosity curative component containing a blend of a relatively high equivalent weight component, a relatively low equivalent weight diol-containing chain extender or crosslinker, and an amine. In addition, at least one of the two components must contain a filler, preferably talc. Although both components according to the invention are characterized by low viscosities of less than about 15,000 mPa.s, the mixed adhesive exhibits excellent resistance to flow, or "sag." In addition, adhesives prepared according to the invention, although used without primer, exhibit excellent high temperature bonding strength Although some of the compounds described as useful for the above references can also be useful for the present invention, none of the references discloses or suggests the combinations of components that are critical to this invention. In particular, none discloses the use of a curative component containing a mixture of a relatively high equivalent weight polyether polyol or aromatic amine terminated polyether, a relatively low equivalent weight diol-containing chain extender or crosslinker, and an amine for resistance to sag.

SUMMARY OF THE INVENTION

The present invention relates to a low-viscosity two-component filled polyurethane adhesive having a urethane content of from 7 to 20 (preferably 9 to 17 and most preferably 10 to 14) percent by weight, based on the weight of nonfilled polyurethane polymer, comprising (a) a low-viscosity isocyanate component in a quantity sufficient to provide an isocyanate index of about 100 to about 150 (preferably 115 to 140) comprising an organic polyisocyanate wherein up to 10 (preferably up to 5) equivalent percent of the isocyanate groups of said organic polyisocyanate have been modified by reaction with one or more isocyanate-reactive compounds; and (b) a low-viscosity curative component comprising
  (i) about 5 to about 50 (preferably 5 to 20) equivalent percent, based on the total equivalents of amino and hydroxyl groups of components (b)(i) and (b)(ii), of a polyether polyol and/or a polyether terminated by aromatic amino groups having an equivalent weight greater than about 500,
  (ii) about 50 to about 95 (preferably 80 to 95) equivalent percent, based on the total equivalents of amino and hydroxyl groups of components (b)(i) and (b)(ii), of one or more chain extenders and/or crosslinkers having an equivalent weight in the range of about 32 to 399, wherein at least one diol chain extender comprises from 50 to 100 percent of the isocyanate-reactive equivalents of component (b)(ii), and
  (iii) one or more isocyanate-reactive diamines or triamines having a molecular weight in the range of about 62 to 400 in a quantity sufficient to produce adequate resistance to flow when components (a) and (b) are mixed;

wherein at least one of components (a) or (b) contains at least one filler in a quantity of from about 10 to about 40 percent by weight based on the total quantity of filled polyurethane adhesive.

DETAILED DESCRIPTION OF THE INVENTION

The isocyanate component comprises an organic polyisocyanate in which part of the isocyanate groups have been modified by reaction with one or more isocyanate-reactive compounds. Suitable polyisocyanates include aliphatic, cycloaliphatic, araliphatic, aromatic, and heterocyclic polyisocyanates of the type described, for example, by W. Siefken in *Justus Liebios Annalen der Chemie*, 562, pages 75 to 136. Such isocyanates include those having the formula

in which n is a number from 2 to about 5 (preferably 2 to 3) and Q is an aliphatic hydrocarbon group containing 2 to about 18 (preferably 6 to 10) carbon atoms, a cycloaliphatic hydrocarbon group containing 4 to about 15 (preferably 5 to 10) carbon atoms, an araliphatic hydrocarbon group containing 8 to 15 (preferably 8 to 13) carbon atoms, or an aromatic hydrocarbon group containing 6 to about 15 (preferably 6 to 13) carbon atoms. Examples of suitable polyisocyanates include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate, and mixtures of these isomers; 1-isocyanato-3,3,5-trimethyl-5-isocyanatomethylcyclohexane (see, e.g. German Auslegeschrift 1,202,785 and U.S. Pat. No. 3,401,190); 2,4- and 2,6-hexahydrotolylene diisocyanate and mixtures of these isomers; hexahydro-1,3- and/or -1,4-phenylene diisocyanate; dicyclohexylmethane-2,4' and/or -4,4'-diisocyanate ("hydrogenated MDI", or "HMDI"); 1,3- and 1,4-phenylene diisocyanate; 2,4- and 2,6-tolylene diisocyanate and mixtures of these isomers ("TDI"); diphenylmethane-2,4'- and/or -4,4'-diisocyanate ("MDI"); naphthylene-1,5-diisocyanate; triphenylmethane-4,4',4"-triisocyanate; polyphenyl-polymethylene-polyisocyanates of the type which may be obtained by condensing aniline with formaldehyde, followed by phosgenation ("crude MDI"), which are described, for example, in British Patents 878,430 and 848,671; norbornane diisocyanates, such as described in U.S. Pat. No. 3,492,330: and perchlorinated aryl polyisocyanates of the type described, for example, in U.S. Pat. No. 3,227,138.

Suitable modified polyisocyanates can be prepared by the reaction of organic polyisocyantes such as described above with one or more compounds containing isocyanate-reactive groups, such as hydroxyl, amino, and thiol groups (preferably hydroxyl and/or amino groups) and having a functionality about 2 to about 6 and an equivalent weight greater than about 500, such that up to about 10 (preferably up to 5) equivalent percent of the isocyanate groups have been modified. Preferred isocyanatereactive compounds have a functionality about 2 to about 6 and an equivalent weight greater than about 500. Examples of suitable modified polyisocyanates include modified polyisocyanates containing urethane groups of the type described, for example, in U.S. Pat. Nos. 3,394,164 and 3,644,457; modified polyisocyanates containing allophanate groups of the type described, for example, in British Patent 994,890, Belgian Patent 761,616, and published Dutch Patent Application 7,102,524; modified polyisocyanates containing isocyanurate groups of the type described, for example, in U.S. Pat. No. 3,002,973, German Patentschriften 1,022,789, 1,222,067 and 1,027,394, and German Offenlegungsschriften 1,919,034 and 2,004,048; modified polyisocyanates containing urea groups of the type described in German Patentschrift 1,230,778; polyisocyanates containing biuret groups of the type described, for example, in German Patentschrift 1,101,394, U.S. Pat. Nos. 3,124,605 and 3,201,372, and in British Patent 889,050; and modified polyisocyanates containing carbodiimide groups of the type described in U.S. Pat. No. 3,152,162. It is also possible to use mixtures of the polyisocyanates described above.

Preferred organic polyisocyanates of the isocyanate component (a) are those based on MDI or HMDI. Examples of such preferred MDI-based polyisocyanates include (i) mixtures of diphenylmethane-2,4'- and/or -4,4'-diisocyanate isomers (preferably having a 2,4'-isomer content of about 5 to about 40 and most preferably 10 to 25 percent by weight), optionally in admixture with polyphenyl polymethylene polyisocyanates, wherein the diphenylmethane diisocyanate isomers comprise from about 20 to 100 percent by weight of the total polyisocyanate mixture; (ii) urethane- and/or urea-modified MDI-based di- and/or polyisocyanates in which no more than about 10 (preferably no more than 5) equivalent percent of the isocyanate groups have been modified by reaction with one or more isocyanate-reactive hydroxyl- and/or amino-containing compounds, wherein said isocyanate-reactive compounds have a functionality of about 2 to about 6 and an equivalent weight greater than about 500; and (iii) dicyclohexylmethane-2,4'- and/or -4,4'diisocyanate, preferably the 4,4'-isomer.

Suitable polyether polyols for use in component (b)(i) include polyethers prepared, for example, by the polymerization of epoxides such as ethylene oxide, propylene oxide, butylene oxide, tetrahydrofuran, styrene oxide, or epichlorohydrin, optionally in the presence of Lewis acids such as $BF_3$, or prepared by chemical addition of such epoxides, optionally added as mixtures or in sequence, to starting components containing reactive hydrogen atoms, such as water, alcohols, or amines. Examples of starting components include ethylene glycol, 1,3- or 1,2-propanediol, 1,2-, 1,3-, or 1,4-butanediol, trimethylolpropane, 4,4'-dihydroxydiphenylpropane, aniline, ammonia, ethanolamine, or ethylene diamine. Sucrose polyethers of the type described, for example, in German Auslegeschriften 1,176,358 and 1,064,938 may also be used according to the invention. Polyethers which contain predominantly primary hydroxyl groups (up to about 90% by weight, based on all of the hydroxyl groups in the polyether) are also suitable. Polyethers modified by vinyl polymers of the kind obtained, for example, by the polymerization of styrene and acrylonitrile in the presence of polyethers (e.g., U.S. Pat. Nos. 3,383,351, 3,304,273, 3,523,093, and 3,110,695 and German Patent 1,152,536) are also suitable, as are polybutadienes containing hydroxyl groups. Particularly preferred polyether polyols include polyoxyalkylene polyether polyols, such as polyoxyethylene diol, polyoxypropylene diol, polyoxybutylene diol, and polytetramethylene diol, as well as polyoxypropylene polyoxyethylene triols.

Other suitable polyol polyethers for use in component (b)(i) include the so-called PHD polyols, which are prepared by reactions of organic polyisocyanates, hydrazine, and polyether polyols. U.S. Pat. No. 3,325,421 discloses a method for producing suitable PHD polyols by reacting a stoichiometric or substoichiometric quantity (relative to diamine) of polyisocyanate dissolved in a polyol having a molecular weight of at least 500 and a hydroxyl number of no more than 225. See also U.S. Pat. Nos. 4,042,537 and 4,089,835.

Suitable polyol polyethers for use in component (b)(i) also include the so-called polymer polyols, which are prepared by polymerizing styrene and acrylonitrile in the presence of a polyether. See, for example, U.S. Pat. Nos. 3,383,351, 3,304,273, 3,523,093, 3,652,639, 3,823,201, and 4,390,645.

Also suitable for use in component (b)(i) are polyethers terminated with aromatic amino groups, the so-called amine terminated polyethers containing aromatically bound primary or secondary (preferably primary) amino groups. Compounds containing amino end groups can also be attached to the polyether chain through urethane, ester, or ether groups. These aromatic amine terminated polyethers can be prepared by any of several methods known in the art.

In one method for preparing aromatic amine terminated polyethers, relatively high molecular weight polyether polyols of the type suitable for the process of the present invention may be converted into the corresponding anthranilic acid esters by reaction with isatoic acid anhydride. Methods for making polyethers containing aromatic amino end groups are disclosed in German Offenlegungsschriften 2,019,432 and 2,619,840 and U.S. Pat. Nos. 3,808,250, 3,975,428, and 4,016,143. Relatively high molecular weight compounds containing amino end groups may also be obtained according to German Offenlegungsschrift 2,546,536 or U.S. Pat. No. 3,865,791 by reacting isocyanate prepolymers based on polyhydroxyl polyethers with hydroxyl-containing enamines, aldimines, or ketimines and hydrolyzing the reaction product.

Preferred aromatic amine terminated polyethers include aminopolyethers obtained by the hydrolysis of compounds containing isocyanate end groups. For example, in a process disclosed in German Offenlegungsschrift 2,948,419, polyethers containing hydroxyl groups (preferably two or three hydroxyl groups) react with polyisocyanates to form isocyanate prepolymers whose isocyanate groups are then hydrolyzed in a second step to amino groups. Preferred amine terminated polyethers are prepared by hydrolyzing an aromatic isocyanate compound having an isocyanate group content of from 0.5 to 40% by weight. The most preferred such polyethers are prepared by first reacting a polyether containing two to four hydroxyl groups with an excess of an aromatic polyisocyanate to form an isocyanate terminated prepolymer and then converting the isocyanate groups to amino groups by hydrolysis. Processes for the production of useful amine terminated polyethers using isocyanate hydrolysis techniques are described in U.S. Pat. Nos. 4,386,218, 4,456,730, 4,472,568, 4,501,873, 4,515,923, 4,525,534, 4,540,720, 4,578,500, and 4,565,645; European Patent Application 97,299; and German Offenlegungsschrift 2,948,419, all the disclosures of which are herein incorporated by reference. Similar products are also described in U.S. Pat. Nos. 4,506,039, 4,525,590, 4,532,266, 4,532,317, 4,723,032, 4,724,252, and 4,855,504 and in U.S. application Ser. Nos. 07/232,302 (filed Aug. 17, 1988) and 07/389,384 (filed Aug. 2, 1989).

Other suitable amine terminated polyethers include aminophenoxy-substituted polyethers described, for example, in European Patent Applications 288,825 and 268,849 and U.S. Application Ser. No. 07/266,725 (filed Nov. 3, 1988).

The aromatic amine terminated polyethers that can be used in component (b)(i) of the present invention are often mixtures with any of the other above-mentioned polyol compounds. These mixtures should preferably contain (on a statistical average) two to three isocyanate-reactive amino end groups.

Preferred compounds for use in component (b)(i) are polyether polyols, the so-called PHD polyols, polyethers terminated with aromatic amino groups, and mixtures thereof. The most preferred compounds for use in component (b)(i) include (a) polyoxypropylene polyoxyethylene triols having an equivalent weight greater than about 500 (preferably greater than 1000) and/or (b) amine terminated polyethers prepared by first reacting a polyether containing two to four hydroxyl groups (preferably a polyoxypropylene polyoxyethylene triol having an equivalent weight greater than about 1000) with an excess of an aromatic polyisocyanate (preferably toluene diisocyanate) to form an isocyanate-terminated prepolymer and then hydrolyzing the isocyanate groups of the isocyanate-terminated prepolymer to form the amine terminated polyether.

Suitable chain extenders and/or crosslinkers for use in component (b)(ii) include compounds containing at least two hydroxyl groups and/or primary or secondary amino groups and having a molecular weight of 32 to 399, but at least one such compound must be a diol comprising from 50 to 100 percent of the equivalents of component (b)(ii). In general, chain extenders are isocyanate-reactive compounds having a functionality of about 2, whereas crosslinkers are isocyanate-reactive compounds having a functionality greater than 2. Preferred chain extenders and crosslinkers contain only hydroxyl groups as the isocyanate-reactive groups. Examples of such hydroxyl containing chain extenders and crosslinkers include ethylene glycol, 1,2- and 1,3-propanediol, 1,4-butanediol, 1,6-hexanediol, glycerol, trimethylolpropane, pentaerythritol, quinitol, mannitol, diethylene glycol, triethylene glycol, tetraethylene glycol, dipropylene glycol, dibutylene glycol. Particularly preferred chain extenders are diols such as ethylene glycol, 1,2-propanediol, and 1,4-butanediol. Suitable but less preferred chain extenders contain both hydroxyl and amino groups, such as diethanolamine and diisopropanolamine. Mixtures of such compounds are, of course, also suitable.

Components (b)(i) and (b)(ii) of the invention are described in terms of equivalent weight, which can be calculated from experimentally determined hydroxyl numbers (and/or similarly determined amine numbers) of a particular component using the well-known relationship described by the formula $$\text{equivalent weight} = \frac{56,100}{\text{hydroxyl (or amine) number}}$$

The corresponding molecular weight of a particular component can, of course, be determined by multiplying the equivalent weight by the functionality of the component. A critical feature of the invention is the use of a relatively high equivalent weight isocyanate-reactive component (b)(i) and a relatively low equivalent weight chain extender or crosslinker (b)(ii).

The relative quantities of components (b)(i) and (b)(ii) are selected in such a way that the isocyanate-reactive groups of component (b)(i) comprise about 5 to about 50 (preferably 5 to 20) equivalent percent and the isocyanate-reactive groups of component (b)(ii) correspondingly comprise about 50 to about 95 (preferably 80 to 95) equivalent percent of the total equivalents of amino and hydroxyl groups of components (b)(i) and (b)(ii).

Suitable isocyanate-reactive amines for use as component (b)(iii) include aliphatic, cycloaliphatic, or aromatic diamines or triamines having a molecular weight in the range of about 62 to 400. Although substantially any such isocyanate-reactive diamine or triamine can be used, the preferred isocyanate-reactive amines are aliphatic, cycloaliphatic, or aromatic diamines having only primary amino groups. Particularly preferred diamines are aliphatic or cycloaliphatic diamines such as ethylenediamine, hexamethylenediamine, bis(4-aminocyclohexyl)methane, and 1-amino-3,3,5-trimethyl-5-aminomethylcyclohexane ("IPDA"). A most preferred diamine is bis(4-aminocyclohexyl)methane.

Aromatic diamines are suitable but less preferred for use as component (b)(iii). Typical aromatic diamines have molecular weights of from about 108 to about 400 and preferably contain exclusively aromatically bound primary or secondary (preferably primary) amino groups. When used at all, the aromatic diamines preferably have alkyl substituents in at least one position ortho to the amino groups. In particular, such aromatic diamines preferably have at least one $C_1$–$C_3$ alkyl substituent located ortho to one of the amino groups and two $C_1$–$C_3$ alkyl substituents located ortho to the other amino group, especially with an ethyl, propyl, and/or isopropyl substituent in at least one such ortho position and with methyl substituents optionally present in other ortho positions. Mixtures of such aromatic diamines are, of course, also suitable. Suitable aromatic diamines include 2,4-diaminomesitylene, 1,3,5-triethyl-2,4-diaminobenzene, 1,3,5-triisopropyl-2,4-diaminobenzene, 1-methyl-3,5-diethyl-2,4-diaminobenzene, 1-methyl-3,5-diethyl-2,6-diaminobenzene, 4,6-dimethyl-2-ethyl-1,3-diaminobenzene, 3,5,3',5'-tetraethyl-4,4-diaminodiphenylmethane, 3,5,3',5'-tetraisopropyl-4,4'-diaminodiphenylmethane, and 3,5-diethyl-3',5'-diisopropyl-4,4'-diaminodiphenylmethane. Other suitable but less preferred aromatic diamines include 1,4-diaminobenzene, 2,4-diaminotoluene, 2,4'- or 4,4'-diaminodiphenylmethane, 3,3'-dimethyl-4,4'-diaminodiphenylmethane, 4,4'-diaminodiphenyl propane-(2,2), t-butyl toluene diamine, 1-methyl-3,5-bis-(methylthio)-2,4- or -2,6-diaminobenzene, and mixtures of such diamines. Particularly preferred aromatic diamines include 1-methyl-3,5-diethyl-2,4-diaminobenzene, either alone or as a mixture with 1-methyl-3,5-diethyl-2,6-diaminobenzene.

Suitable but much less preferred isocyanate-reactive amines (b)(iii) contain both hydroxyl and amino groups. Mixtures of such compounds with the compounds mentioned above are, of course, also suitable.

The quantity of isocyanate-reactive amine (b)(iii) is selected to be sufficient to produce adequate resistance to flow when components (a) and (b) are mixed. Suitable quantities of component (b)(iii) include the range of about 0.05 to about 10 percent by weight based on the total quantity of the curative component (b).

Suitable fillers include silicate-containing minerals, such as antigorite, serpentine, hornblends, amphibiles, chrysotile, talc, mica, and kieselguhr; metal oxides such as kaolin, aluminum oxides, titanium oxides, and iron oxides; metal salts such as chalk and heavy spar (barium sulfate); inorganic pigments such as cadmium sulfide and zinc sulfide; and glass, asbestos powder, carbon fibers, and the like. Preferred fillers are substantially inert under the conditions encountered when the components of the invention are mixed. A particularly preferred filler is talc. Fillers may be used either individually or in admixture. The fillers are added to either or both of components (a) and (b) in quantities totaling about 10 to about 40 percent by weight based on the total quantity of the filled polyurethane adhesive.

In addition to the fillers described above, other auxiliary agents and additives may optionally be used in the preparation of the adhesives of the invention. Suitable auxiliary agents and additives may include, for example, catalysts for the polyisocyanate-polyaddition reaction, drying agents, surface-active additives, anti-foaming agents, pigments, dyes, UV stabilizers, plasticizers, and fungistatic or bacteriostatic substances, such as those described in European Patent Application 81,701 at column 6, line 40, to column 9, line 31.

Both the isocyanate component and the curative component of the present invention are characterized by low viscosities, a characteristic that facilitates bulk handling. As used herein, the term "low viscosity" refers to a Brookfield viscosity at 25° C. of less than about 15,000 mPa.s. Each component used in the present invention is characterized by viscosities at 25° C. of less than 15,000 mPa.s. Despite the use of such low viscosity components are used, the mixed adhesive exhibits excellent resistance to sag.

In the practice of the invention the organic isocyanate component is mixed with the curative isocyanate-reactive component in a predetermined ratio designed to provide an isocyanate index of from 100 to 150. The term "isocyanate index" is defined as the quotient, multiplied by 100, of the number of isocyanate groups divided by the number of isocyanate-reactive groups. The filler, as well as the optional additives and auxiliaries, can be mixed with either or both of the isocyanate component and the isocyanate-reactive component but is preferably mixed with both components. The components may be mixed by any of various known methods, including impingement mixing and static mixing, and they may be applied to the substrate to be bonded as thin films or in the form of beads.

Adhesives prepared according to the invention, although used without primer, exhibit excellent high temperature bonding strength, as measured by the tests described in the examples. In contrast, polyurethanes made with polyol blends having the same average equivalent weight as those of the invention but composed of blends of intermediate equivalent weight polyols (instead of a high equivalent weight polyol and a low equivalent weight chain extender or crosslinker according to the invention) do not perform well in the high temperature bonding tests described in the examples. The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all percentages are percentages by weight.

DESCRIPTION OF THE PREFERRED EMBODIMENTS

Example 1

A polyol blend according to the invention was prepared from 71.5 parts of a poly(propylene oxide) triol capped with ethylene oxide (equivalent weight 2000); 14.7 parts of an aromatic amine terminated polyether (equivalent weight 1833) prepared by the hydrolysis of an aromatic isocyanate-terminated polyether polyol;-12 parts of 1,4-butanediol; 3.5 parts of bis(4-aminocyclohexyl)methane (molecular weight 210); 13.3 parts of sodium potassium aluminosilicate in castor oil; 28 parts of talc; and 0.02 parts of dimethyltin dilaurate catalyst. The polyol blend had a viscosity of 8860 mPa.s at 25° C. and an equivalent weight of 394.

Example 2

A polyol blend according to the invention was prepared from 85.3 parts of a poly(propylene oxide) triol capped with ethylene oxide (equivalent weight 2000); 14.7 parts of an aromatic amine terminated polyether (equivalent weight 1833) prepared by the hydrolysis of an aromatic isocyanate-terminated polyether polyol; 25 parts of 1,4-butanediol; 2.5 parts of bis(4-aminocyclohexyl)methane (molecular weight 210); 13.3 parts of sodium potassium aluminosilicate in castor oil; 35 parts of talc; and 0.02 parts of dimethyltin dilaurate catalyst. The polyol blend had a viscosity of 12,880 mPa.s at 25° C. and an equivalent weight of 271.

Example 3

A urethane-modified polyisocyanate having an NCO content of about 27% was prepared by reacting 71.5 parts of a polymeric diphenylmethane diisocyanate (2,4'-isomer content of about 19% and NCO functionality of about 2.4) with 13.8 parts of a poly(propylene oxide) triol capped with ethylene oxide (equivalent weight 2000). Talc (36.5 parts) was blended with the modified polyisocyanate to yield a composition with an isocyanate content of 18.2% and a viscosity of 8400 mPa.s at 25° C.

Example 4

Talc (30 parts) was blended with 71.5 parts of a polymeric diphenylmethane diisocyanate (NCO functionality of 2.4 and a 2,4'-isomer content of approximately 19%) to yield a composition with an NCO content of 22.9% and a viscosity of 5040 mPa.s.

Examples 5–6

Comparison Curatives

Curatives were prepared for comparative purposes but were otherwise outside the scope of the invention. As indicated by the test data listed in the Table (Examples 7–10, below), blends made with intermediate equivalent weight polyols do not furnish the same properties as blends according to the invention made from a high equivalent weight component and a low equivalent weight chain extender.

Example 5

(Comparison)

A blend was prepared from 118.9 parts of a poly(propylene oxide) diol (equivalent weight 213), 10.3 parts of a poly(propylene oxide) triol (equivalent weight 150), 3.5 parts of bis(4-aminocyclohexyl)methane (molecular weight 210), 13.3 parts of sodium potassium aluminosilicate in castor oil, 34 parts of talc, and 0.02 parts of dimethyltin dilaurate catalyst. The resultant polyol blend has an equivalent weight of 273.

Example 6

(Comparison)

A blend was prepared from 65.9 parts of a poly(propylene oxide) diol (equivalent weight 500), 29 parts of a poly(propylene oxide) diol (equivalent weight 213), 18.1 parts of a poly(propylene oxide) triol based on triethanolamine (equivalent weight 373), 3.5 parts of bis(4-aminocyclohexyl)-methane (molecular weight 210), 13.3 parts of sodium potassium aluminosilicate in castor oil, 34 parts of talc, and 0.02 parts of dimethyltin dilaurate catalyst. The polyol blend has an equivalent weight of 443.

Examples 7–10

The adhesive formulations were tested for performance using the lap shear (SAE J1525) and wedge peel (SAE J1882) tests. Tests were conducted using the formulations listed in the Table. All samples were prepared at an isocyanate index of 130.

Lap Shear Procedure

Sheets of fiber-reinforced plastic ("FRP") (4 in. × 9 in. × 0.125 in., or about 10 cm × 23 cm × 0.32 cm) were bonded together using metal spacers to insure a bond thickness of 0.030 inch (about 0.76 mm) and a overlap length of 1 inch (about 2.5 cm). The surface of the FRP was wiped with a dry cloth prior to bonding to remove dust. No other surface preparation was used. The adhesive was cured in a heated press for 90 seconds at a temperature of 135° C., followed by a postcure of 30 minutes at 135° C. Test specimens (1 inch, or 2.5 cm, wide) were cut from the cured samples using a diamond tipped saw. Samples were tested at a temperature of 82° C. after conditioning for one hour at 82° C.

Wedge Peel Procedure

Sheets of fiber-reinforced plastic (6 in. × 6 in. × 0.125 in., or about 15 cm × 15 cm × 0.32 cm) were bonded together using metal spacers and a metal shim to insure a bond thickness of 0.030 inch (about 0.76 mm) and a bond area 2 inches (about 5.1 cm) in width. The surface of the FRP was wiped with a dry cloth prior to bonding to remove dust. No other surface preparation was used. The adhesive was cured in a heated press for 90 seconds at a temperature of 135° C., followed by a postcure of 30 minutes at 135° C. Test specimens (2 in. × 6 in., or about 5.1 cm × 15 cm) were cut from the cured samples using a diamond tipped saw.

TABLE

| Example | Isocyanate | Polyol | 82° C. Lap Shear PSI | 82° C. Lap Shear % Fiber Tear | Wedge Peel % Fiber Tear | % Urethane Content |
|---|---|---|---|---|---|---|
| 7 | Ex. 3 | Ex. 1 | 443 | 89 | 85 | 10.3 |
| 8[a] | Ex. 4 | Ex. 6 | 74 | 0 | 38 | 10.3 |
| 9 | Ex. 4 | Ex. 2 | 317 | 93 | 85 | 14.6 |
| 10[a] | Ex. 4 | Ex. 5 | 163 | 0 | 83 | 14.4 |

[a]Example 8 is a comparison example for Example 7 and Example 10 is a comparison example for Example 9. It was necessary to keep comparison Examples 8 and 10 in the heated clamp for 180 seconds to achieve sufficient cure.

These results show that formulations containing the combination of a high equivalent weight polyol and a low equivalent weight chain extender exhibit superior adhesive performance, especially in the critical 82° C. lap shear test.

What is claimed is:

1. A low-viscosity two component filled polyurethane adhesive having a urethane content of from 7 to 20 percent by weight, based on the weight of nonfilled polyurethane polymer, consisting essentially of
   (a) a low-viscosity isocyanate component in a quantity sufficient to provide an isocyanate index of about 100 to about 150 comprising an organic polyisocyanate wherein up to 10 equivalent percent of the isocyanate groups of said organic polyisocyanate have been modified by reaction with one or more isocyanate-reactive compounds; and
   (b) a low-viscosity curative component comprising
      (i) 5 to 50 equivalent percent, based on the total equivalents of amino and hydroxyl groups of components (b)(i) and (b)(ii) of an isocyanate-reactive polyether selected from the group consisting of a polyether polyol, a polyether terminated by aromatic amino groups and a mixture thereof, having an equivalent weight greater than 500,
      (ii) 50 to 95 equivalent percent, based on the total equivalents of the amino and hydroxyl groups of components (b)(i) and (b)(ii), of one or more chain extenders and/or crosslinkers having molecular weight in the range of 32 to 399, wherein b(ii) is characterized in that it contains at least one diol chain extender which comprises from 50 to 100 percent of the isocyanate-reactive equivalents of component (b)(ii), and
      (iii) one or more isocyanate-reactive diamines or triamines having a molecular weight in the range of 62 to 400 in a quantity sufficient to produce adequate resistance to flow when components (a) and (b) are mixed;

wherein at least one of components (a) or (b) contains at least one filler in a quantity of from about 10 to about 40 percent by weight based on the total quantity of the filled polyurethane adhesive.

2. A polyurethane adhesive according to claim 1 having a urethane content of from 9 to 17 percent by weight, based on the weight of nonfilled polyurethane polymer.

3. A polyurethane adhesive according to claim 1 having a urethane content of from 10 to 14 percent by weight, based on the weight of nonfilled polyurethane polymer.

4. A polyurethane adhesive according to claim 1 wherein the organic polyisocyanate is used in a quantity sufficient to provide an isocyanate index of about 5 to about 140.

5. A polyurethane adhesive according to claim 1 wherein the organic polyisocyanate comprises a mixture of diphenylmethane-2,4'-diisocyanate and/or diphenylmethane-4,4'-diisocyanate isomers, optionally in admixture with polyphenyl polymethylene polyisocyanates, wherein the diphenylmethane diisocyanate isomers comprise from 20 to 100 percent by weight of the total organic polyisocyanate mixture.

6. A polyurethane adhesive according to claim 5 wherein the diphenylmethane-2,4'-diisocyanate isomer comprises 5 to 40 percent by weight of the mixture of diphenylmethane diisocyanate isomers.

7. A polyurethane adhesive according to claim 5 wherein the diphenylmethane-2,4'-diisocyanate isomer comprises 10 to 25 percent by weight of the mixture of diphenylmethane diisocyanate isomers.

8. A polyurethane adhesive according to claim 5 wherein up to 10 equivalent percent of the isocyanate groups of the polyisocyanate mixture are modified by reaction with one or more isocyanate-reactive hydroxyl- and/or amino-containing compounds having a functionality of 2 to 6 and an equivalent weight greater than 500.

9. A polyurethane adhesive according to claim 8 wherein up to 5 equivalent percent of the isocyanate groups are modified.

10. A polyurethane adhesive according to claim 1 wherein the organic polyisocyanate is dicyclohexylmethane-2,4'-diisocyanate and/or dicyclohexylmethane-4,4'-diisocyanate.

11. A polyurethane adhesive according to claim 1 wherein the organic polyisocyanate is dicyclohexylmethane-4,4'-diisocyanate.

12. A polyurethane adhesive according to claim 1 wherein component (b)(i) comprises 5 to 20 equivalent percent of the total equivalents of amino and hydroxyl groups of components (b)(i) and (b)(ii) and component (b)(ii) comprises 80 to 95 equivalent percent of the total equivalents of amino and hydroxyl groups of components (b)(i) and (b)(ii).

13. A polyurethane adhesive according to claim 1 wherein component (b)(i) is a polyether polyol, a PHD polyol, a polyether terminated with aromatic amino groups, or a mixture thereof.

14. A polyurethane adhesive according to claim 13 wherein the polyether polyol is a polyoxypropylene polyoxyethylene triol having an equivalent weight greater than 500.

15. A polyurethane adhesive according to claim 14 wherein the polyoxypropylene polyoxyethylene triol has an equivalent weight greater than 1000.

16. A polyurethane adhesive according to claim 13 wherein the polyether terminated with aromatic amino groups is prepared by reacting a polyether containing two to four hydroxyl groups with an excess of an aromatic polyisocyanate to form an isocyanate-terminated prepolymer and hydrolyzing said isocyanate-terminated prepolymer to form the amine terminated polyether.

17. A polyurethane adhesive according to claim 16 wherein the polyether is a polyoxypropylene polyoxyethylene triol having an equivalent weight greater than 1000.

18. A polyurethane adhesive according to claim 16 wherein the aromatic polyisocyanate is toluene diisocyanate.

* * * * *